US012682452B2

(12) United States Patent
Aichert et al.

(10) Patent No.: US 12,682,452 B2
(45) Date of Patent: Jul. 14, 2026

(54) TRAINING OF MACHINE-LEARNING ALGORITHMS FOR DIGITAL PATHALOGY USING HEALTHY-TISSUE WHOLE SLIDE IMAGES

(71) Applicants: Siemens Healthcare GmbH, Erlangen (DE); Georg-August-Universitaet Goettingen Stiftung oeffentlichen Rechts Universitaetsmedizin Goettingen, Goettingen (DE)

(72) Inventors: Andre Aichert, Erlangen (DE); Marvin Teichmann, Erlangen (DE); Hanibal Bohnenberger, Bovenden (DE); Birgi Tamersoy, Erlangen (DE)

(73) Assignees: SIEMENS HEALTHINEERS AG, Forchheim (DE); GEORG-AUGUST-UNIVERSITÄT GÖTTINGEN STIFTUNG ÖFFENTLICHEN RECHTS UNIVERSITÄTSMEDIZIN GÖTTINGEN, Göttingen (DE)

( * ) Notice: Subject to any disclaimer, the term of this patent is extended or adjusted under 35 U.S.C. 154(b) by 376 days.

(21) Appl. No.: 18/302,243

(22) Filed: Apr. 18, 2023

(65) Prior Publication Data

US 2023/0342927 A1 Oct. 26, 2023

(30) Foreign Application Priority Data

Apr. 20, 2022 (EP) .................................... 22168971

(51) Int. Cl.
*G06V 10/80* (2022.01)
*G06T 7/00* (2017.01)

(52) U.S. Cl.
CPC .. *G06T 7/0012* (2013.01); *G06T 2207/20081* (2013.01); *G06T 2207/20084* (2013.01)

(58) Field of Classification Search
CPC ..... G06F 18/2433; G06T 2207/200081; G06T 2207/20084; G06T 7/0012; G06V 10/7788; G06V 10/809; G06V 10/82; G06V 2201/03
USPC ....................................................... 382/128
See application file for complete search history.

(56) References Cited

U.S. PATENT DOCUMENTS

| | | |
|---|---|---|
| 2021/0248736 A1 | 8/2021 | Kamen et al. |
| 2022/0076053 A1* | 3/2022 | Gulsun .................. G06N 3/045 |
| 2022/0198666 A1* | 6/2022 | Gorton ................... G16H 30/40 |

OTHER PUBLICATIONS

Nazeri et al., "Two-Stage Convolutional Neural Network for Breast Cancer Histology Image Classification" Apr. 1, 2018, Whole Document. (Year: 2018).*
Li et al. "Discriminative Pattern Mining for Breast Cancer Histopathology Image Classification via Fully Convolutional Autoencoder". Date: Feb. 20, 2019, Whole Document. Address: https://ieeexplore.ieee.org/document/8664469 (Year: 2019).*

(Continued)

*Primary Examiner* — Chad Dickerson
(74) *Attorney, Agent, or Firm* — Harness, Dickey & Pierce, P.L.C.

(57) ABSTRACT

Various examples of the disclosure pertain to using whole-slide images that depict healthy tissue for a training process for at least one machine-learning algorithm for digital pathology. For instance, an autoencoder neural network can be trained based on the healthy tissue.

15 Claims, 3 Drawing Sheets

(56) References Cited

OTHER PUBLICATIONS

Ström P.-et al.:"Pathologist-level grading of prostate biopsies with artificial intelligence" arXiv preprint arXiv:1907.01368, 2019.

Simonyan, Karen, and Zisserman, Andrew "Very Deep Convolutional Networks for Large-Scale Image Recognition" https://arxiv.org/abs/1409.1556v6 (2014); 2014.

Kaiming He, Xiangyu Zhang, Shaoqing Ren, and Jian Sun. Deep residual learning for image recognition. CoRR, abs/1512.03385, 2015.

Nazeri K. et al.:"Two-stage convolutional neural network for breast cancer histology image classification" In International Conference Image Analysis and Recognition, pp. 717-726. Springer, 2018.

Gillard, R. et al.: "Using Progressive Context Encoders for Anomaly Detection in Digital Pathology Images", in: bioRxiv, Jul. 4, 2021. https://www.biorxiv.org/content/10.1101/2021.07.02.450957v1.full.pdf.

Radosavovic I. et al.:"Designing network design spaces". In Proceedings of the IEEE/CVF Conference on Computer Vision and Pattern Recognition, pp. 10428-10436, 2020.

Shen, Y.; Ke, J.: "Representative Region Based Active Learning for Histological Classification of Colorectal Cancer", in: 2021 IEEE 18th International Symposium on Biomedical Imaging (ISBI)Apr. 13-16, 2021, Nice, France.pp. 1730-1733 doi: 10.1109/ISBI48211.2021.9433931.

Kather, J.N. et al.:"Pan-cancer image-based detection of clinically actionable genetic alterations", in: Nat Cancer. Aug. 2020 ; 1(8): 789-799. doi:10.1038/s43018-020-0087-6.

Mingxing Tan et al.:"Efficientnet: Rethinking model scaling for convolutional neural networks. arXiv preprint", arXiv:1905.11946, 2019.

Lee, Sanghoon et al: "Interactive Classification of Whole-Slide Imaging Data for Cancer Researchers"; Cancer Research, vol. 81, No. 4, Feb. 15, 2021 (Feb. 15, 2021); pp. 1171-1177, XP055963044; 2021.

Pocevičiūtė, M. et al.:"Unsupervised Anomaly Detection in Digital Pathology Using Gans", in: 2021 IEEE 18th International Symposium on Biomedical Imaging (ISBI) Apr. 13-16, 2021, Nice, France.

Redekop, E.; Chernyavskiy, A.:"Uncertainty-Based Method for Improving Poorly Labeled Segmentation Datasets", in: 2021 IEEE 18th International Symposium on Biomedical Imaging (ISBI) Apr. 13-16, 2021, Nice, France., pp. 1831-1835.

Li, Xingyu et al; "Discriminative Pattern Mining for Breast Cancer Histopathology Image Classification via Fully Convolutional Autoencoder"; arxiv.org, May 5, 2020 (May 5, 2020), XP081657733; Retrieved from the Internet: URL:https://arxiv.org/pdf/1902.08670.pdf; 2020.

Vaswani, A. et al.:"Attention Is All You Need", in: 31st Conference on Neural Information Processing Systems (NIPS 2017), Long Beach, CA, USA.

* cited by examiner

TRAINING OF MACHINE-LEARNING ALGORITHMS FOR DIGITAL PATHALOGY USING HEALTHY-TISSUE WHOLE SLIDE IMAGES

CROSS-REFERENCE TO RELATED APPLICATION(S)

The present application claims priority under 35 U.S.C. § 119 to European Patent Application No. 22168971.4, filed Apr. 20, 2022, the entire contents of which are incorporated herein by reference.

FIELD

Various examples of the disclosure generally relate to digital pathology, i.e., using machine-learning algorithms in the context of analyzing images depicting tissue to detect, e.g., cancer or tumor or other pathologies. Various examples of the disclosure specifically relate to training of machine-learning algorithms for digital pathology.

RELATED ART

In histopathology, a tissue sample of a patient is inspected to study a manifestation of a disease such as cancer.

Conventionally, a practitioner can manually inspect the tissue samples—e.g., stained using a chemical stain—using a microscope. In further detail, thin tissue slides are prepared by sectioning a tissue sample. Then, an image is acquired depicting the tissue slide.

Recently, algorithmic analysis of tissue samples has become possible. This is referred to as digital pathology. Reference techniques of digital pathology use Convolutional Neural Networks (CNNs) as an example of machine-learning (ML) algorithms. Such techniques are described in: Karen Simonyan and Andrew Zisserman. Very deep convolutional networks for large-scale image recognition. arXiv preprint arXiv:1409.1556, 2014. Such techniques are further described in: Kaiming He, Xiangyu Zhang, Shaoqing Ren, and Jian Sun. Deep residual learning for image recognition. CoRR, abs/1512.03385, 2015. Such techniques are further described in: Mingxing Tan and Quoc V Le. Efficientnet: Rethinking model scaling for convolutional neural networks. arXiv preprint arXiv:1905.11946, 2019. Such techniques are further described in: Ilija Radosavovic, Raj Prateek Kosaraju, Ross Girshick, Kaiming He, and Piotr Dollar. Designing network design spaces. In Proceedings of the IEEE/CVF Conference on Computer Vision and Pattern Recognition, pages 10428-10436, 2020.

Oftentimes, digital pathology requires processing large images, e.g., Whole Slide Tissue Images (WSI). A WSI depicts a microscopically magnified tissue slide of macroscopic scale, e.g., centimeters; thus, the WSI can include a large number of pixels. WSIs typically come at a size of tens of thousands of pixels in each dimension. Tissue slides either from biopsies or resected tumor tissue are prepared on glass slides, which can be scanned by a digital microscope in high resolution (gigapixels) and high throughput. Because of their size and number, WSI is especially well-suited for data-hungry ML algorithms. They can be processed by an ML algorithm as a whole or on the basis of small image patches cut out from the large images.

It has been found that training ML algorithms to process WSIs can be time consuming and/or error prone. The sheer amount of image data oftentimes requires large amounts of expensive annotations for supervised learning. Annotations—to determine ground-truth labels for the training process—to are expensive and time consuming and pathology requires specific solutions with training and validation data for a myriad of specific tissue or cancer types, organs, resection versus biopsy and possibly parameters of the preparation of the physical tissue sample (fixation, dies, slicing etc.). For example, for a standard tumor recognition task which is used as intermediate representation in many ML-based pathology systems, the pathologist is required to provide local, ideally pixelwise ground-truth labels for the training process of the machine-learning algorithm. In addition, obtaining high-resolution ground-truth labels can be challenging since there are many fine structures and areas which are hard to categorize, even for a domain expert.

Various approaches to facilitate training of ML algorithms that process WSIs have been disclosed.

For example, minimizing the amount of required annotations by choosing difficult and diverse examples has been proposed, which enable training of high quality models with few data. See Representative Region Based Active Learning For Histological Classification Of Colorectal Cancer, Yiqing Shen, Jing Ke, 2021 IEEE 18th International Symposium on Biomedical Imaging (ISBI); also see Using Progressive Context Encoders for Anomaly Detection in Digital Pathology Images, Ryan Gillard, Chady Meroueh, Qiangqiang Gu, Naresh Prodduturi, Sandhya Patil, Thomas J Flotte, Steven N Hart https://www.biorxiv.org/content/10.1101/2021.07.02.450957v1.full.pdf In addition, it has been tried to avoid manual labeling altogether by using semi-manual approaches based an unsupervised Segmentation, like laplace filtering. See Pathologist-Level Grading of Prostate Biopsies with Artificial Intelligence Ström, Peter, et al. arXiv preprint 2019; arXiv: 190701368

The publication Uncertainty-Based Method for Improving Poorly Labeled Segmentation Datasets Ekaterina Redekop, Alexey Chernyavskiy International Symposium on Biomedical Imaging (ISBI) 2021 suggests an automatic approach to improve poorly labeled pathology data, making it potentially easier to annotate data.

Also known are the following publications:

Unsupervised anomaly detection in digital pathology using GANs Milda Pocevičiūtė, Gabriel Eilertsen, Claes Lundstrom 18th International Symposium on Biomedical Imaging (ISBI) 2021

Pan-cancer image-based detection of clinically actionable genetic alterations Kather, Jakob Nikolas, et al. Nature cancer 1.8 (2020): 789-799.

Two-Stage Convolutional Neural Network for Breast Cancer Histology Image Classification K Nazeri, A Aminpour, M Ebrahimi International Conference Image Analysis and Recognition 2018.

SUMMARY

Accordingly, a need exists for advanced techniques for digital pathology. Specifically, a need exists for advanced techniques of obtaining training data for facilitating a training process of at least one ML algorithm for digital pathology.

This need is met by the features of the independent claims. The features of the dependent claims define embodiments.

According to an example, a computer-implemented method of facilitating a training process of at least one ML algorithm is disclosed. The at least one ML algorithm is for digital pathology. The method includes obtaining multiple WSI depicting healthy tissue and further includes providing, to the training process, the multiple WSI that depict the healthy tissue, along with an indication that the multiple WSI exclusively depict healthy tissue.

A computer program or a computer-program product or a computer-readable storage medium includes program code. The program code can be loaded and executed by at least one processor. Upon loading and executing the program code, the at least one processor performs a computer-implemented method of facilitating a training process of at least one ML algorithm. The at least one ML algorithm is for digital pathology. The method includes obtaining multiple WSI depicting healthy tissue and further includes providing, to the training process, the multiple WSI that depict the healthy tissue, along with an indication that the multiple WSI exclusively depict healthy tissue.

A device includes a processor and a memory. The processor, upon loading program code from the memory and executing the program code, is configured to execute a computer-implemented method of facilitating a training process of at least one ML algorithm. The at least one ML algorithm is for digital pathology. The method includes obtaining multiple WSI depicting healthy tissue and further includes providing, to the training process, the multiple WSI that depict the healthy tissue, along with an indication that the multiple WSI exclusively depict healthy tissue.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For the purposes of clarity, various dimensions of the drawings may have been exaggerated.

DETAILED DESCRIPTION

Figure 1:
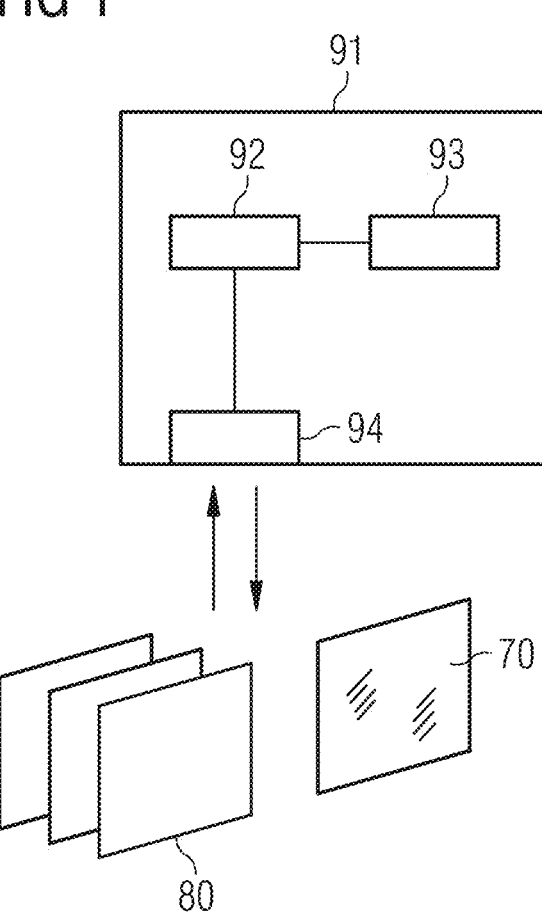
FIG. 1 schematically illustrates a device according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of digital pathology are described. Input images depicting tissue samples can be processed using an ML algorithm. The ML algorithm can receive an input image and process the input image. An example machine-learning (ML) algorithm is a neural network algorithm (NN).

As a general rule, the NN includes multiple layers. The input to a first layer is the input image. Each layer can apply one or more mathematical operations on the input values, e.g., convolutions, nonlinear excitations, pooling operations, to give just a few examples. The input to a layer can be formed by the output of a preceding layer (feed-forward). Feedback of values or skip-connection skipping layers are possible.

The NN for digital pathology can infer at least one semantic histopathology feature. The at least one semantic histopathology feature can describe whether the tissues sample is a manifestation of a disease. Healthy and/or unhealthy tissue may be detected and specifically localized. It would be possible to rate an organ fitness of an organ anatomy in view of tumor growth. A tumor may be graded in accordance with a predefined scale, e.g., to determine a severity. Example semantic histopathology features that could be inferred can be selected from the group consisting of: Gleason scoring, cancer grade/cancer stage estimation, clinical pathway prediction, sub-tumor classification, metastasis evaluation, microsatellite instability (MSI) or stability. For example, a cancer grade can be in accordance with a predefined grading system/scale. Examples would include the Bloom-Richardson score or TNM classification of malignant tumors. Classification systems are available for brain tumors, breast tumors, prostate cancer (Gleason scoring), and other kind of tumors.

Via a machine learning, a practitioner can be assisted in performing an analysis of the tissue sample.

The input image received by the ML algorithm could have a size of at least 4.000×4.000 pixels, or at least 10.000× 10.000 pixels, or at least 1E6×1E6 pixels. The input image could be a WSI. The input image could be acquired using optical microscopy. The tissue slide for which the input image is acquired can be stained using a chemical stain. Illumination can be used to generate a respective contrast.

Various techniques are based on the finding that staining of tissue and acquisition of additional WSIs is considerably cheaper than obtaining ground-truth labels from an expert.

Various techniques are based on the further finding that, since re-sectioning tissue slides from a tissue sample typically include some slides that include entirely healthy tissue, WSIs from those healthy tissue slides can be readily acquired.

It has been found that such WSI that do not depict unhealthy tissue—i.e., exclusively depict healthy tissue—can have a benefit for a subsequent training process of a ML algorithm.

According to examples disclosed herein, the possibility of acquiring healthy tissue slides in digital pathology is exploited, to make explicit use of healthy examples while training ML algorithms.

According to an example, the training process of at least one ML algorithm is facilitated by obtaining multiple WSIs that depict healthy tissue. These WSIs that only depict healthy tissue and do not depict unhealthy tissues will be referred to as healthy-tissue WSIs, hereinafter.

As a general rule, various options are available for obtaining the healthy-tissue WSIs. For example, it would be possible to prepare multiple tissue slides from a tissue sample; some of these tissue slides may depict healthy and unhealthy tissue, while other tissue slides may only depict healthy tissue. This may be readily apparent by macroscopic inspection. The healthy-tissue WSIs can be acquired based on those tissue slides that only depict healthy tissue. It would be possible to take a tissue sample from a patient that is known not to suffer from cancer or other diseases, so as to ensure that healthy-tissue WSIs do not depict unhealthy tissue. For instance, it would be possible to take a tissue sample from an animal. In some examples, healthy-tissue WSIs may me loaded from a data repository, e.g., a picture archiving system, where the respective image files are labeled as only depicting healthy tissue.

Then, the multiple healthy-tissue WSIs can be provided to the training process along with an indication that the multiple healthy-tissue WSIs exclusively depict healthy tissue.

The training process can accordingly appropriately use the multiple healthy-tissue WSIs that are identified as such by the indication.

To give an example, training process may be implemented as an unsupervised training process, at least for the healthy-tissue WSIs. This means that manual annotations are not required for the healthy-tissue WSIs. This allows training on a much greater corpus of data, since rather than the availability of data the annotation is the limiting factor for supervised learning in digital pathology.

It may not be required to query additional ground-truth labels associated with the healthy-tissue WSIs from an expert, in addition to automatically determined ground-truth labels that indicate that the multiple healthy-tissue WSIs depict healthy tissue.

As a general rule, various options are available for making use of the healthy-tissue WSIs. Various scenarios for facilitating the training process of the at least one ML algorithm are conceivable. Along with such variations in the use case implemented based on the healthy-tissue WSIs, different types of ML algorithms may be trained using the training process.

For example, ML algorithms configured to determine which areas of cancer-afflicted WSIs differ conceptually from the healthy-tissue WSIs may be used. These type of ML algorithms go by the name of "novelty detection" algorithms, because novel features—here: unhealthy tissue—are detected, which novel features have not been included in the training data.

FIG. 1 schematically illustrates a device 91 according to various examples. The device 91 is configured to implement logic associated with digital pathology. The device 91 includes a processor 92, a memory 93, and an interface 94. For instance, WSIs 80 may be received by the processor 92 via the interface 94. One or more semantic histopathology features may be output via the interface 94, e.g., annotated to whole-slide images 80.

The processor 92 can load program code from the memory 93 and execute the program code. Upon loading and executing the program code, the processor 92 can perform techniques as disclosed herein, e.g.: facilitating a training process of an ML algorithm for digital pathology; executing the training process of the ML algorithm for digital pathology; implementing inference by executing the ML algorithm for digital pathology; etc.

Figure 2:
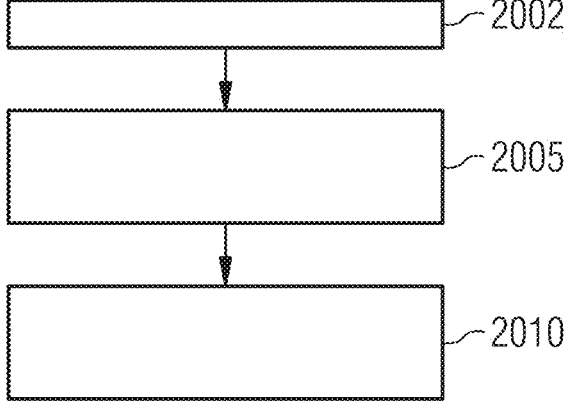
FIG. 2 is a flowchart of a method according to various examples.

FIG. 2 is a flowchart of a method according to various examples. The method of FIG. 2 implements digital pathology. For instance, the method of FIG. 2 could be at least partially implemented by the processor 92, e.g., upon loading and executing program code.

At box 2002, training data for training at least one ML algorithm is obtained, e.g., gathered, loaded, collected, and/or measured. For instance, it would be possible to obtain multiple healthy-tissue WSIs. Optionally it would be possible to also obtain WSIs that depict both healthy as well as unhealthy tissue.

At box 2005, based on the training data of box 2002, the training process is executed.

As a general rule, the training process can include multiple stages.

Some stages are summarized in TAB. 1 below.

TABLE 1

Two stages of a training process for training an ML algorithm.

| Stage | | Example description |
|---|---|---|
| I | Determining ground-truth labels | First, ground-truth labels may be determined for the training data that is obtained at box 2002. Determining ground-truth labels can be implemented using manual annotation by an expert. A respective annotation process can be used. As part of the annotation process, using a user-interaction protocol, some patches of a WSI can be presented to an expert via a human-machine interface (e.g., monitor) along with a respective query for a ground-truth label; the expert can input the ground-truth label. Segmentation could be used to discern different tissue |

TABLE 1-continued

Two stages of a training process for training an ML algorithm.

| Stage | Example description |
|---|---|
| | types as a function of position. Such manual determining of ground-truth labels is sometimes referred to as supervised learning. |
| | Thus, the user-interaction protocol helps determining ground-truth labels to WSIs based on respective user queries and user input. |
| | In some specific examples, the annotation process can be an active-learning annotation process that may be interactive. Here, in multiple iterations the queries are iteratively adapted, e.g., depending on the user action, to ensure a steep learning curve of the at least one ML algorithm. For instance, the particular patch of a WSI may be selected ad hoc in each iteration, e.g., based on a current training state of the ML algorithm to-be-trained. The current training state depends on the preceding annotation which is typically based at least in parts on user action, e.g., manual determination of labels, etc.. Alternatively or additionally, for at least some of the training data, the labels can be determined without user interaction. For instance, it would be possible to determine one or more ground-truth labels based on an indication that certain WSIs of the training data exclusively depict healthy tissue. This can be termed unsupervised learning. |
| II  Parameterization | Then, once the ground-truth labels have been determined, it would be possible to set weights of the at least one ML algorithm based on the training data, as well as the associated one or more ground-truth labels. |
| | In particular, based on one or more predetermined loss functions, a loss value can be determined and then in an iterative process it can be attempted to minimize the loss value by appropriately setting the weights. A loss function can define a comparison between the ground-truth label and an output of the ML algorithm in its current training state. |
| | Respective techniques of setting weights of at least one ML algorithm are, in principle, well known in the art and need not be described here in further detail. |

Once the at least one ML algorithm has been trained using the training process, at box 2010, inference can be implemented. This means that without knowledge of ground-truth labels, further input data—e.g., further WSIs—can be processed by the at least one ML algorithm to make a prediction of one or more semantic histopathology features.

Figures 3, 4:
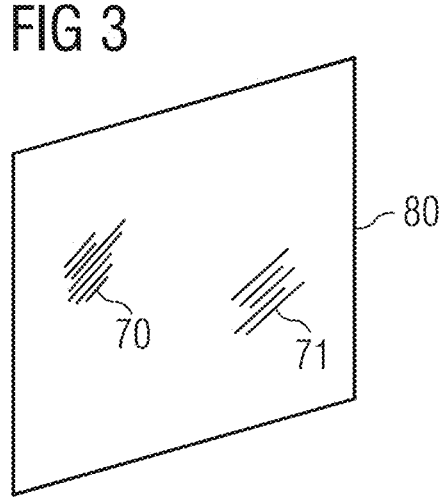
FIG. 3 schematically illustrates a WSI according to various examples.
FIG. 4 schematically illustrates an annotation process of a training process for training an ML algorithm according to various examples.

FIG. 3 schematically illustrates a WSI 80. The WSI 80 can include more than E9 or E10 pixels. The WSI 80 can depict a tissue slide having extents of mm. The WSI 80 depicts healthy tissue 70 and unhealthy tissue 71.

While FIG. 3 illustrates an example WSI 80 that depicts, both, healthy tissue 70 and unhealthy tissue 71, a healthy-tissue WSI 80 would not depict unhealthy tissue 71, but only depict healthy tissue 70.

According to various examples, it is possible to consider such healthy-tissue WSI 80 in connection with a training process of at least one ML algorithm for digital pathology. There are various options available for making use of healthy-tissue WSIs 80 in connection with the training process of at least one ML algorithm and some of the possible examples are summarized below in TAB. 2.

TABLE 2

Various options for using healthy tissue WSIs in a training process for a ML algorithm. Such options can also be combined with each other, e.g., as explained in connection with a combination of example II an example I above, or as explained in connection with a combination of example IV and example III above.

| | Brief description | Example details |
|---|---|---|
| I | Standard annotation informed by entirely healthy instances of training data | One option to incorporate information from healthy data is to include it in the usual training process of supervised learning (cf. TAB. 1: stage I). Depending on the concrete problem at hand, it is possible to automatically assign ground-truth labels that label all tissue on the healthy tissue WSI as 'healthy' or 'no-tumor' tissue. This can be done whenever the training processes obtained a WSI along with the indication that this WSI exclusively depicts healthy tissue. This means that it is possible to automatically determine spatially-resolved ground-truth labels that uniformly label the entire healthy-tissue WSI as "no tumor". In further detail, it would be possible to batch process the healthy-tissue WSIs in the annotation process, to thereby assign the ground-truth labels to the healthy-tissue WSIs that identify each one of the multiple healthy-tissue WSIs as exclusively depicting healthy tissue. Other WSIs that do not exclusively depict healthy tissues (and are, thus, not accompanied by the indication that they would exclusively depict healthy tissue) may be treated conventionally in the annotation process, e.g., using supervised learning in a respective user-interaction protocol. Said batch processing of the healthy-tissue WSIs yields large amount of training data with little effort. This enables to require significantly fewer or even no amount of annotations for healthy regions on cancerous slides, when subsequently annotating, using expert input, further WSIs. Healthy slides are also a good way to improve robustness and generalization of the model, for example by adding healthy slides from additional patients or even laboratories. Doing so is particularly cost effective, since healthy slides do not require any additional annotation effort. |
| II | Informing an active-learning annotation process | The annotation process can include an interactive active-learning user-interaction protocol. Such interactive active-learning user-interaction protocol can include multiple iterations. Each iteration can include at least one query to obtain at least one respective ground-truth label. I.e., per iteration, the expert can determine at least one ground-truth label based on respective parts of the training data that are presented via the user-interaction protocol. The user- |

TABLE 2-continued

Various options for using healthy tissue WSIs in a training process for a ML algorithm. Such options can also be combined with each other, e.g., as explained in connection with a combination of example II an example I above, or as explained in connection with a combination of example IV and example III above.

| Brief description | Example details |
| --- | --- |
| | interaction protocol is interactive. I.e., user queries of subsequent iterations depend on user queries of preceding iterations. This is also illustrated in FIG. 4. |
| | FIG. 4 schematically illustrates an interactive active-learning user-interaction protocol 3002. At box 3005, one or more parts of the training data are selected in a respective iteration 3032 form basis of a user query. For instance, a specific WSI or a specific patch of a WSI may be selected. At box 3010, the user is queried to determine at least one ground-truth label for the currently selected one or more parts of the training data. It is then possible at box 3015 to (re-) train the ML algorithm, to obtain a current training state. At box 3020, it can be judged whether a further iteration 3030 is required. For instance, the accuracy of the ML algorithm in its current training state could be judged. If a further iteration 3030 is required, then, at the next iteration of box 3005, further/different one or more parts of the training data are selected. This depends on the current training state of the ML algorithm. For instance, unknown or heterogeneous samples of the training data could be preferred, in order to establish a steep learning curve. |
| | In such interactive active-learning user-interaction protocol 3002, it is possible to implement the batch processing of the multiple healthy-tissue WSIs in a selected one of the multiple iterations 3030. For instance, it would be possible to batch process the multiple healthy tissue WSIs at the first one or an early iteration 3030, so as to avoid that further instances of the training data are selected at box 3005 that correspond to healthy tissue. |
| | For instance, the availability of many healthy examples will suppress uncertainty in healthy regions automatically putting focus on diseased tissue (in subsequent selections at box 3005) and thereby saving annotations. |
| III Novelty detection to identify diseased regions | The availability of a large corpus of 'healthy training data' also opens the door to new problem classes in ML logic. Specifically, an ML algorithm could analyze only the healthy data and build a detailed model of its distribution (for instance, a so-called autoencoder NN). This model can then be used to detect out-of-distribution examples. Concretely, the at least one ML algorithm that is trained by the training process based on the multiple healthy tissue WSIs can include a novelty-detection algorithm. Here, upon training the novelty-detection algorithm, unhealthy tissue can be detected in further WSIs-e.g., during inference, cf. FIG. 2-box 2010-using the novelty-detection algorithm, wherein the unhealthy tissue is associated with abnormalities identified by the novelty- |

TABLE 2-continued

Various options for using healthy tissue WSIs in a training process for a ML algorithm. Such options can also be combined with each other, e.g., as explained in connection with a combination of example II an example I above, or as explained in connection with a combination of example IV and example III above.

Figure 5:
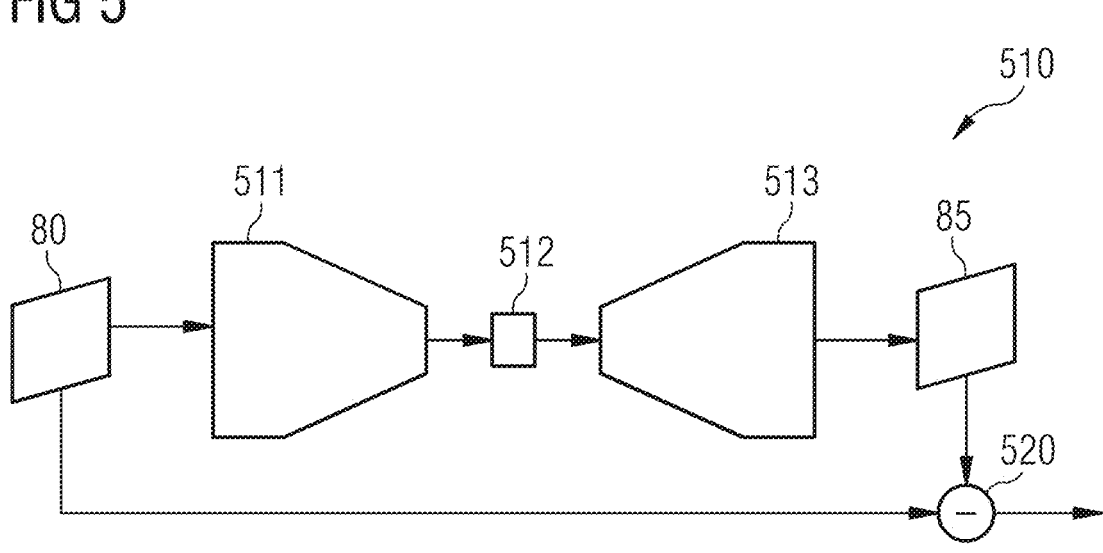
FIG. 5 schematically illustrates an autoencoder neural network algorithm according to various examples.

| Brief description | Example details |
| --- | --- |
| | detection algorithm. The abnormalities correspond to differences vis-á-vis features expected in view of the training process (which is based, as explained above, on the healthy-tissue WSIs) . |
| | For instance, FIG. 5 illustrates an example of such novelty-detection algorithm 510, here implemented by an autoencoder NN. The autoencoder NN includes an encoder branch 511 and a decoder branch 513. A WSI 80 is provided as input data to the encoder branch 511 and an encoded representation 512 is determined as an output of the encoder branch. The encoded representation 512 of the WSI 80 forms the input to the decoder branch 513. Thus, a decoded representation 85 of the WSI 80 is obtained as an output of the overall autoencoder NN 510. The decoded representation 85 can be compared to the WSI 80 that forms the input, i.e., determining a reconstruction error 520. A pixel-wise comparison would be possible. Deviations-i.e., reconstruction errors-correspond to abnormalities. The abnormalities can be localized within the WSI 80 where a pixel-wise comparison is used. |
| | In a scenario in which the autoencoder NN 510 is exclusively trained based on healthy-tissue WSIs (and specifically not trained based on WSIs that also depict unhealthy tissue), the autoencoder NN 510 is trained to reconstruct such healthy-tissue WSIs; however, the autoencoder NN 510 does not learn to reconstruct WSIs that also depict unhealthy tissue. Thus, whenever, during inference, a WSI 80 is input that also includes unhealthy tissue, this would result in an imperfectly reconstructed representation 85 and corresponding abnormalities can be detected at 520. Thereby, unhealthy tissue can be localized. |
| | In the case of an autoencoder NN trained on healthy-tissue WSI, high reconstruction loss of an image region in a cancerous tissue sample should be highly correlated to morphological changes due to the tumor or the tumor itself. |
| IV Building anatomical models | For tumor staging-i.e., determining a cancer grade in accordance with a predetermined scale-, the extent of tumor growth plays an important role. Definitions of tumor stage for various organs is related to the anatomical structures that have been affected or passed through. Due to the high variability in tumor morphology (e.g., various cancer types and changing appearance during progression) training an ML algorithm for understanding organ anatomy is an easier and better-defined task in healthy-tissue WSIs. Thus, an ML algorithm rating organ fitness of an organ anatomy in view of tumor growth can be trained using (e.g., exclusively) healthy-tissue WSIs. If combined with novelty-detection (cf. example III), this could inform a cancer |

TABLE 2-continued

Various options for using healthy tissue WSIs in a
training process for a ML algorithm. Such options can also be
combined with each other, e.g., as explained in connection
with a combination of example II an example I above, or as
explained in connection with a combination of example IV and
example III above.

Figure 6:
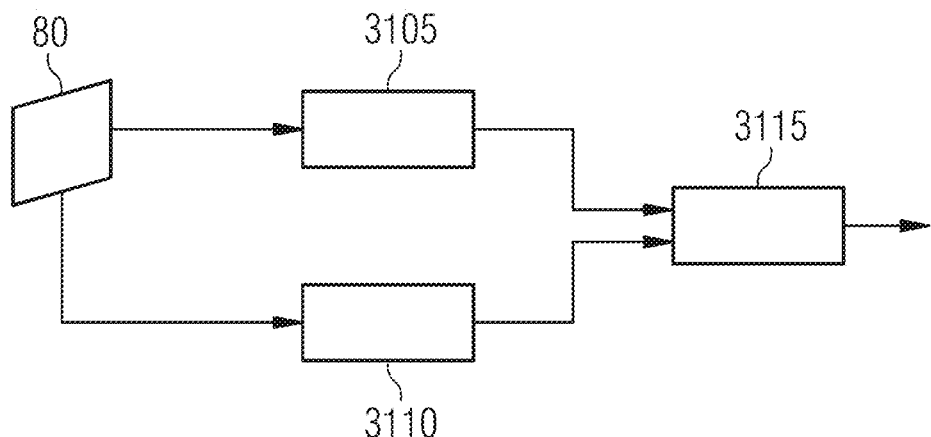
FIG. 6 schematically illustrates an architecture including multiple ML algorithms according to various examples.

| Brief description | Example details |
| --- | --- |
| | grading and TNM staging system, for example, while requiring less annotations due to lesser variability. Such combination of multiple ML algorithms is illustrated in FIG. 6. In FIG. 6, a WSI 80 is provided as input to a 1st ML algorithm 3105 and a 2nd ML algorithm 3110. For instance, the 1st ML algorithm 3105 could be a novelty-detection algorithm, e.g., the autoencoder NN 510 as discussed in connection with FIG. 5. Using the 1st ML algorithm 3105, it would be possible to detect unhealthy tissue 71. Using the 2nd ML algorithm 3110, it is possible to rate an organ fitness of an organ anatomy in view of tumor growth. Accordingly, the 2nd ML algorithm 3110 could also be referred to as "anatomical modeling algorithm". The outputs of both ML algorithms 3105, 3110 can be then be fused in a respective fusion algorithm 3115, to determine a cancer grade of a tumor based on a result of the 1st ML algorithm 3105, as well as based on a result of the 2nd ML algorithm 3110. |

Summarizing, techniques for digital pathology, specifically for facilitating a training process for at least one ML algorithm have been disclosed. Such and further effects are achieved by using healthy-tissue WSIs as at least parts of training data for a least one ML algorithm. Techniques have been disclosed in which the at least one ML algorithm includes a novelty-detection algorithm. Unhealthy tissue can be detected in WSIs during inference based on a reconstruction error of such novelty-detection algorithm.

Using the techniques, costs can be reduced by requiring fewer manual annotations. Performance can be improved by including additional training data, possibly without increasing the number of patients—by preparing more than one tissue slide per tissue sample, healthy tissue slides can be available as a side product to unhealthy tissue slides. The techniques disclosed herein facilitate quicker adaptation of ML algorithm to new domains within digital pathology. Further, research can be supported, e.g., by identifying biomarkers from tissue morphology.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A computer-implemented method of facilitating a training process of at least one machine-learning algorithm for digital pathology, the computer-implemented method comprising:
obtaining multiple whole-slide images exclusively depicting healthy tissue;
providing, to the training process, the multiple whole-slide images with an indication that the multiple whole-slide images exclusively depict healthy tissue; and
batch processing the multiple whole-slide images in an annotation process to automatically assign ground-truth labels to the multiple whole-slide images that identify each one of the multiple whole-slide images as exclusively depicting healthy tissue, wherein
the at least one machine-learning algorithm includes a novelty-detection algorithm including an auto encoder neural network algorithm,
the auto encoder neural network algorithm is exclusively trained on the multiple whole-slide images, and
an entirety of each of the multiple whole-slide images is provided to the training process.

2. The computer-implemented method of claim 1, wherein the training process comprises the annotation process for determining ground-truth labels for a plurality of whole-slide images, the plurality of whole-slide images comprising the multiple whole-slide images and multiple further whole-slide images, the multiple further whole-slide images depicting healthy tissue and unhealthy tissue.

3. The computer-implemented method of claim 2, wherein the annotation process comprises an interactive active-learning user-interaction protocol comprising multiple iterations, each iteration comprising at least one user query to obtain at least one respective ground-truth label, wherein user queries of subsequent iterations depend on user queries of preceding iterations, and the batch processing of the multiple whole-slide images is implemented in a selected one of the multiple iterations.

4. The computer-implemented method of claim 1, further comprising:

executing the training process based on the multiple whole-slide images; and upon training the novelty-detection algorithm, detecting unhealthy tissue by processing a further whole-slide image using the novelty-detection algorithm, unhealthy tissue being associated with abnormalities identified by the novelty-detection algorithm.

5. The computer-implemented method of claim 4, wherein the auto encoder neural network algorithm includes an encoder branch configured to encode an input data and a decoder branch configured to decode an encoded representation of the input data encoded by the encoder branch, and the detecting detects the abnormalities based on a reconstruction error between the input data and an output data output by the decoder branch.

6. The computer-implemented method of claim 1, wherein the at least one machine-learning algorithm further comprises an anatomical modelling algorithm to rate an organ fitness of an organ anatomy in view of tumor growth, and the computer-implemented method further comprises:

executing the training process to train the anatomical modelling algorithm based on the multiple whole-slide images.

7. The computer-implemented method of claim 6, further comprising:

determining a cancer grade of a tumor based on a result of the novelty-detection algorithm and a further result of the anatomical modelling algorithm.

8. The computer-implemented method of claim 1, further comprising:

executing the training process in an unsupervised manner.

9. The computer-implemented method of claim 1, further comprising:

automatically determining one or more ground-truth labels based on the indication that the multiple whole-slide images exclusively depict healthy tissue; and setting weights of the at least one machine-learning algorithm based on the multiple whole-slide images that depict healthy tissue and the one or more ground-truth labels.

10. A non-transitory computer readable medium comprising program code, when executed by a processor, causes the processor to execute a method of facilitating a training process of at least one machine-learning algorithm for digital pathology, the method comprising:

obtaining multiple whole-slide images depicting healthy tissue;

providing, to the training process, the multiple whole-slide images with an indication that the multiple whole-slide images exclusively depict healthy tissue; and batch processing the multiple whole-slide images in an annotation process to assign ground-truth labels to the multiple whole-slide images that identify each one of the multiple whole-slide images as exclusively depicting healthy tissue, wherein the at least one machine-learning algorithm includes a novelty-detection algorithm including an autoencoder neural network algorithm, the autoencoder neural network algorithm is exclusively trained on the multiple whole-slide images, and an entirety of each of the multiple whole-slide images is provided to the training process.

11. The non-transitory computer readable medium of claim 10, wherein the program code, when executed by the processor, causes the processor to further execute:

automatically determining one or more ground-truth labels based on the indication that the multiple whole-slide images exclusively depict healthy tissue; and setting weights of the at least one machine-learning algorithm based on the multiple whole-slide images that depict healthy tissue and the one or more ground-truth labels.

12. The computer-implemented method of claim 3, further comprising:

executing the training process based on the multiple whole-slide images; and upon training the novelty-detection algorithm, detecting unhealthy tissue by processing a further whole-slide image using the novelty-detection algorithm, unhealthy tissue being associated with abnormalities identified by the novelty-detection algorithm.

13. The computer-implemented method of claim 12, wherein the auto encoder neural network algorithm includes an encoder branch configured to encode an input data and a decoder branch configured to decode an encoded representation of the input data encoded by the encoder branch, and the detecting detects the abnormalities based on a reconstruction error between the input data and an output data output by the decoder branch.

14. The computer-implemented method of claim 5, wherein the at least one machine-learning algorithm further comprises an anatomical modelling algorithm to rate an organ fitness of an organ anatomy in view of tumor growth, and the computer-implemented method further comprises:

executing the training process to train the anatomical modelling algorithm based on the multiple whole-slide images.

15. The computer-implemented method of claim 14, further comprising:

determining a cancer grade of a tumor based on a result of the novelty-detection algorithm and a further result of the anatomical modelling algorithm.

\* \* \* \* \*